(12) United States Patent
Smith et al.

(10) Patent No.: US 6,794,788 B1
(45) Date of Patent: Sep. 21, 2004

(54) MODULAR MOTOR AND HOUSING

(75) Inventors: Stephen D. Smith, Bartlesville, OK (US); Joe Liu C. Liu, Tulsa, OK (US); Rick Bailey, Bartlesville, OK (US); Roy Fleshman, Morrison, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/579,997

(22) Filed: May 26, 2000

(51) Int. Cl.[7] ................................................ H02K 1/12
(52) U.S. Cl. ......................... 310/254; 310/88; 310/71; 310/52
(58) Field of Search ................... 310/254, 71, 87–88, 310/171, 52, 85; 417/372, 375, 377, 421

(56) References Cited

U.S. PATENT DOCUMENTS

| | | | | |
|---|---|---|---|---|
| 1,960,484 A | * | 5/1934 | Ekstromer | 310/112 |
| 2,098,958 A | * | 11/1937 | Ekstromer | 171/252 |
| 4,010,392 A | * | 3/1977 | Bogdanov et al. | 310/87 |
| 4,578,608 A | * | 3/1986 | Mech et al. | 310/112 |
| 4,815,949 A | * | 3/1989 | Rabson | 417/417 |
| 5,939,813 A | * | 8/1999 | Schob | 310/254 |
| 6,201,327 B1 | * | 3/2001 | Rivas | 310/87 |
| 6,288,470 B1 | * | 9/2001 | Breit | 310/254 |

OTHER PUBLICATIONS

Merriam—Webster's collegiate Dictionary, 1998, pp. 63.*

* cited by examiner

Primary Examiner—Thanh Lam
(74) Attorney, Agent, or Firm—Van Someren, P.C.; Jeffrey E. Griffin; Brigitte Jeffery Echols (57) ABSTRACT

A modular electric motor. The modular motor includes a plurality of mechanically and electrically coupleable stator sections and mechanically coupleable housing sections. At least one stator section has conductors extending longitudinally therethrough for generating a magnetic field to impart rotative motion in a rotor. A given motor may be assembled to a variety of desired lengths by mechanically and electrically coupling the appropriate number of motor sections. This facilitates construction of a desired horsepower motor for a given application.

19 Claims, 8 Drawing Sheets

MODULAR MOTOR AND HOUSING

FIELD OF THE INVENTION

The present invention relates generally to electric motors, and particularly to a modular stator assembly that facilitates motor construction.

BACKGROUND OF THE INVENTION

Submersible electric motors are used in submersible pumping systems to lift wellbore fluids from depths of up to several thousand feet. A conventional motor used to provide the equivalent pumping power on the surface cannot be used in a wellbore because the diameter of such a motor would be too wide to fit into the wellbore. Therefore, as compared to short, thick surface motors, the stators of submersible electric motors are relatively thin and extremely elongated.

Elongating the stator allows the motor to produce the required torque to drive a pump by developing magnetic force over a stator of a much larger length. Thus, if long enough a motor that produces a relatively smaller torque per foot can produce a sufficient total torque. Depending on the horsepower required of the motor, electric submersible pumping system motors can utilize stator assemblies thirty feet long or more. Preparation of the stator windings requires long, thin polished rods that serve as needles for pulling the insulated, conductor wires through a lengthy assembly of stator laminations. This conventional process is a comparatively slow and expensive process for manufacturing such motors. Additionally, repair or rebuilding of such motors often requires complete destruction or tear down of the motor with little component repair value due to the unitary stator assembly.

It would be advantageous to have a modular stator that could be used to construct motors, such as motors utilized in electric submersible pumping systems. Benefits of such a modular construction would include reduced cost and assembly time, reduced repair time and reduced motor component inventory.

SUMMARY OF THE INVENTION

The present invention features an electric motor with a modular stator. The modular stator comprises a plurality of stator sections and a rotor disposed within the stator sections. The stator sections are mechanically and electrically coupleable to form a stator of a desired length. According to additional aspects of the invention, a submersible pumping system is provided that utilizes an electric motor with a modular stator assembly.

According to another aspect of the invention, a method is provided for facilitating the assembly of an electric motor. The method includes manufacturing a plurality of stator sections wherein each stator section is mechanically and electrically coupleable to another stator section. The stator sections include a top stator section electrically coupleable to a source of electric power, a middle stator section with conductors extending longitudinally therethrough, and a bottom section with conductors. When coupled, the stator sections complete a conductive loop through the stator sections to the source of electric power.

The method includes determining the desired motor length for a given application and assembling a top section, a bottom section, and an appropriate number of middle sections to form a stator of the desired length. The method further includes assembling the stator sections and disposing a rotor within the stator sections.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
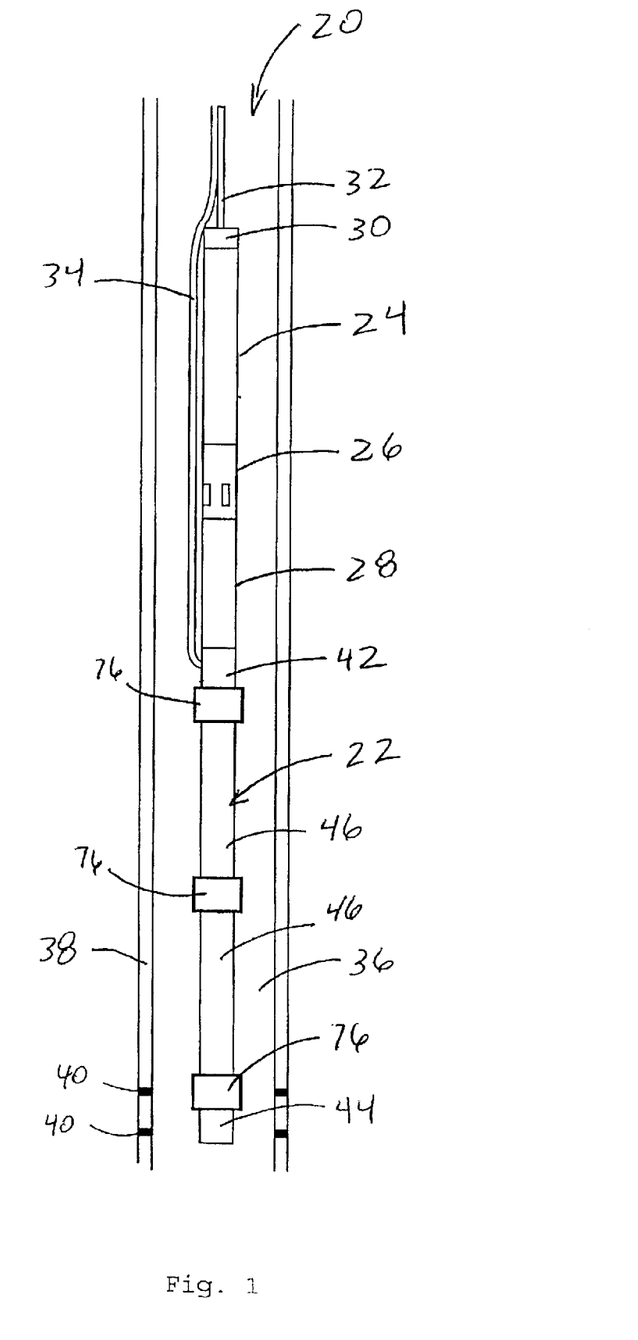
FIG. 1 is a front elevational view of a submersible pumping system that utilizes a submersible electric motor, according to a preferred embodiment of the present invention.

Referring generally to FIG. 1, a submersible pumping system 20 is shown that utilizes a modular electric motor 22, according to a preferred embodiment of the present invention. The submersible pumping system 20 may be comprised of a variety of components depending on the particular application or environment in which it is used. However, submersible pumping system 20 typically includes a submersible motor, such as modular electric motor 22, to drive a submersible pump 24. Fluid is drawn into the submersible pump 24 through a pump intake 26. Typically, a motor protector 28 is connected between submersible pump 24 and electric motor 22 to isolate well fluid from internal motor oil within motor 22. A coupler 30 is used to connect the submersible pumping system to a deployment system 32, such as production tubing, cable or coil tubing. A multi-conductor cable 34 supplies three-phase alternating current (AC) electrical power from the surface to motor 22.

Submersible pumping system 20 is designed for deployment in a wellbore 36 containing desirable production fluids, such as petroleum. In a typical application, wellbore 36 is drilled and lined with a wellbore casing 38. Holes 40 in the wellbore casing 38 allow production fluids to enter wellbore 36. Submersible pumping system 20 is deployed within wellbore 112 to a desired location in order to pump the production fluids. Instead of a unitary stator, that may be thirty feet long or more, the illustrated electric motor 22 utilizes modular stator sections, including, for example, a top stator section 42, a bottom stator section 44, and two middle stator sections 46. Electricity flowing through the middle stator sections 46 produces a rotating magnetic field that causes rotation of a rotor within electric motor 22. The rotor is drivingly coupled through motor protector 28 and pump intake 26 to submersible pump 24.

Although two middle stator sections 46 are illustrated, the exact number of middle stator sections 46 in a given submersible electric motor 22 can vary depending on the system requirements. During assembly, the modular stator sections are partially assembled, the rotor is placed inside the partially assembled modular stator, and then assembly is completed. In the event of repair or servicing, the modular stator sections can be disassembled and uncoupled as necessary. For example, if a particular stator section requires replacement, the surrounding components can be uncoupled, e.g. unplugged, and a replacement stator section inserted. This modular concept greatly simplifies the assembly, servicing, repair, and stocking of replacement stator components for electric motor 22.

Figure 2:
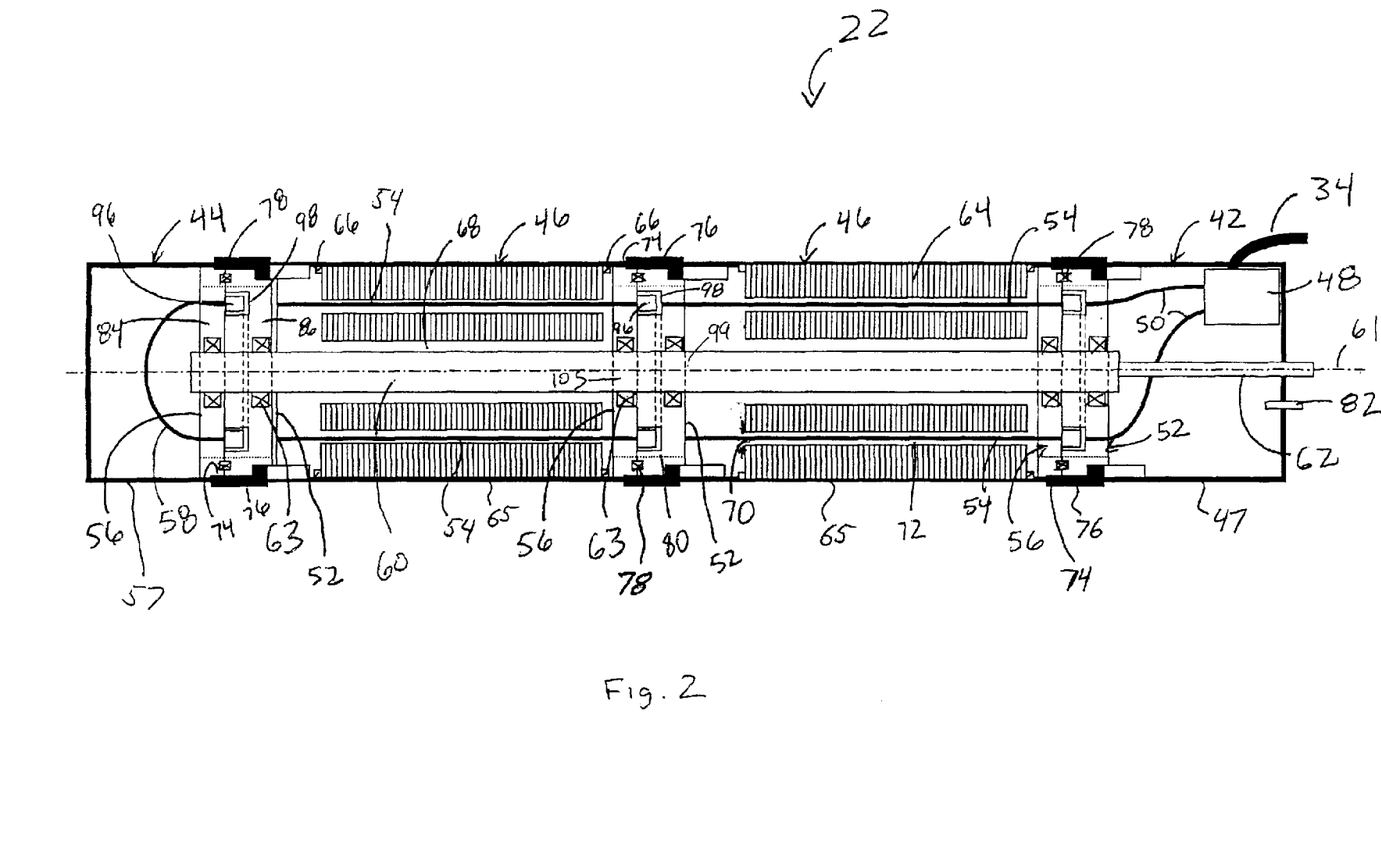
FIG. 2 is a cross-sectional view of a submersible electric motor, according to a preferred embodiment of the present invention.

Referring generally to FIG. 2, a cross-sectional view is shown of submersible electric motor 22. Electric power from multi-conductor cable 34 is coupled through an outer housing 47 of stator section 42 to an electrical connector 48 of the stator section 42. Conductors 50 in cable 34 are coupled to a female connector 52 in top stator section 42. Conductors 54 in middle stator section 46 are coupled to a male electrical connector 56. When top stator section 42 is mated to middle stator section 46, conductors 50 in top stator section 42 are electrically coupled to conductors 54 in the first middle stator section 46. In this view, for clarity, only two conductors 54 are shown extending through each middle stator section 46. Typically, there are multiple conductors for each single conductor shown here. Furthermore, as will be more fully discussed in the following paragraphs, there are multiple groups of these multiple conductors oriented around a central axis.

Conductors 54 of middle stator section 46 extend longitudinally through middle stator section 46 to another female connector 52. This female connector is designed to engage the male connector 56 of the second middle stator section 46. Similarly, conductors 54 extend through the second middle stator section 46 to another female connector 52. Bottom stator section 44 also has a male connector 56, disposed within an outer housing 57, and conductors 58 of bottom stator section 44 are coupled to male connector 56. When bottom stator section 44 is mated to the second middle stator section 46, conductors 58 of bottom stator section 44 electrically couple each conductor 54 of middle stator section 46 with a corresponding conductor 54 disposed through the middle stator section 46 at a different location.

In the illustrated embodiment, each middle stator section 46 is formed with male connector 56 at one end and female connector 52 at the other end. This allows a plurality of middle stator sections 46 to be coupled together end-to-end. Additionally, top stator sect on 42 is configured with a female connector 52 and bottom stator section 44 is configured with a male connector 56. Note that the selection of whether a top or bottom stator section is to be male or female is entirely arbitrary, as long as the selection is consistent so that the modular stator sections can be assembled together.

When the modular stator sections are joined, the conductors in the top, middle and bottom stator sections are electrically coupled to a source of electrical power on the surface. Electricity flowing through conductors 54 in middle stator sections 46 produces a rotating magnetic field that causes a rotor 60 within the modular stator to rotate about an axis 61. Rotor 60 is coupled to and rotates a shaft 62 which, in turn, rotates pump 24. Bearings 63 are used to support rotor 60. The magnetic field that causes rotation of rotor 60 is prompted by a plurality of metallic laminations 64 that are stacked together and held in place within an outer housing 65 by snap rings 66, as in conventional stator construction.

Figure 3:
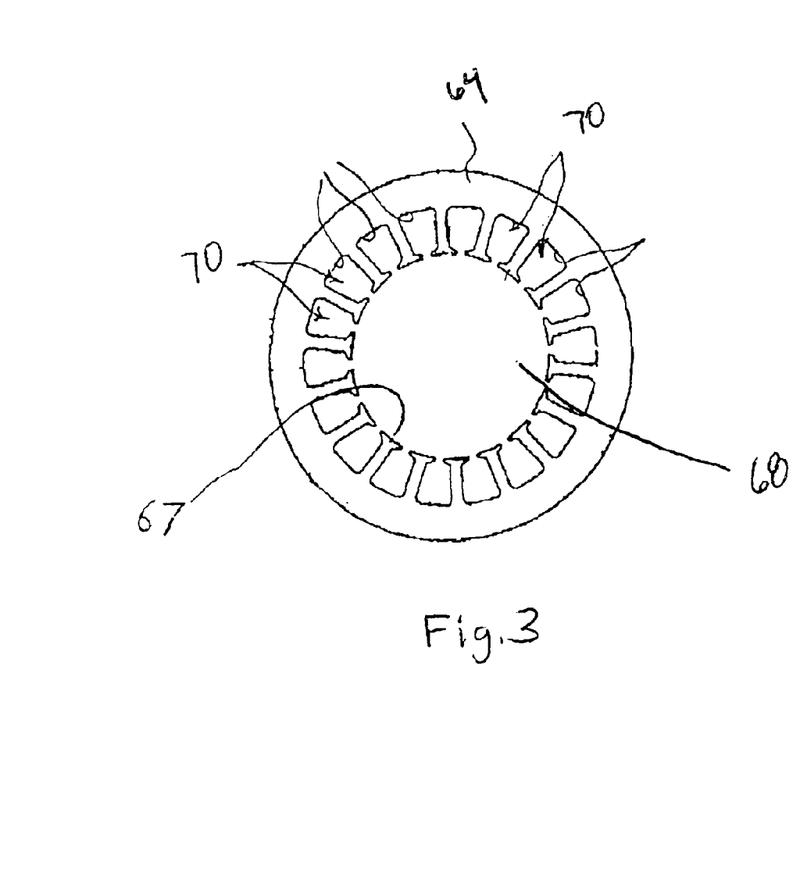
FIG. 3 is a top view of a stator lamination, according to a preferred embodiment of the present invention.

As best illustrated in FIG. 3, each metallic lamination 64 has a central opening 67. As laminations 64 are stacked to form a middle stator section 46, central openings 67 form an interior passage or opening 68 that extends through the middle stator section 46 in which rotor 60 is disposed. Laminations 64 also have a plurality of openings 70 that are radially outlying from the central opening 67. As laminations 64 are stacked, openings 70 are aligned to create longitudinal slots 72. Typically, multiple conductors 54 are inserted through each of the longitudinal slots 72. The lamination stacks are disposed within outer housing 65.

Modular stator sections may be mechanically coupled together in a variety of ways. In the illustrated embodiment (see FIGS. 2, 9 and 10), mechanical coupling is provided by plug connectors 52, 56, and by threaded collar assemblies mounted to the external housings 47, 57 and 65. The modular stator sections 42, 44 and 46 are configured with either a male threaded end 74 or a female threaded collar 76 formed as part of or mounted to the corresponding outer housing 47, 57 or 65. A seal 78, such an O-ring, a crush ring, or a metal-to-metal seal maintains a fluid seal between the inside of motor 22 and wellbore 36. A passageway 80 allows motor oil to pass from one modular stator section to another. A passageway 82 in top stator section 42 allows motor oil to expand into or contract from the motor protector 28 as the temperature of the oil rises and falls during operation.

Figure 4:
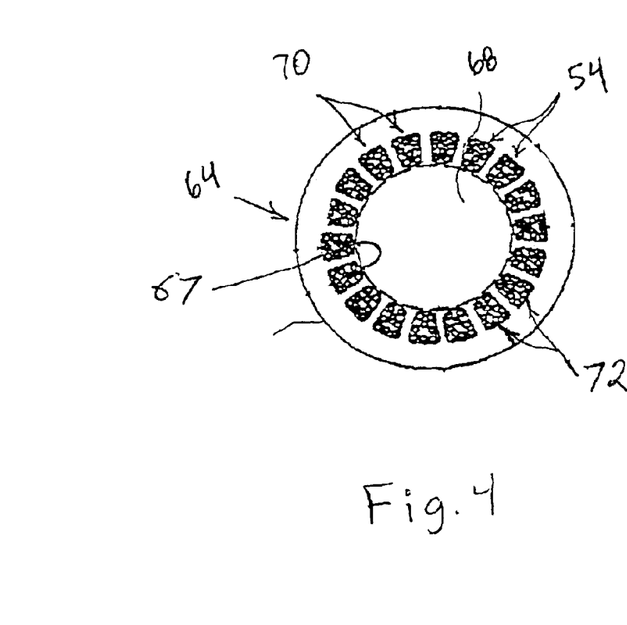
FIG. 4 is a top view of conductors extending through longitudinal openings in a stator lamination, according to a preferred embodiment of the present invention.

Referring generally to FIG. 4, a cross-sectional view is shown of a metallic lamination 64 with a plurality of conductors 54 wound through each axial opening 70. However, as described above, FIGS. 2, 9 and 10 only illustrate one conductor 54 disposed through each axial opening 70 for clarity.

Figure 5:
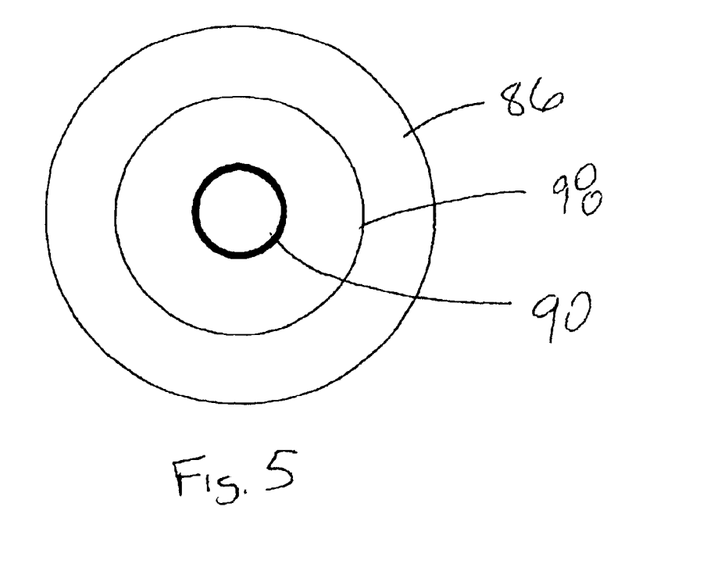
FIG. 5 is a top view of a portion of a female insulated block and female terminations for conductors extending through an opening in a stator lamination, according to a preferred embodiment of the present invention.
Figure 6:
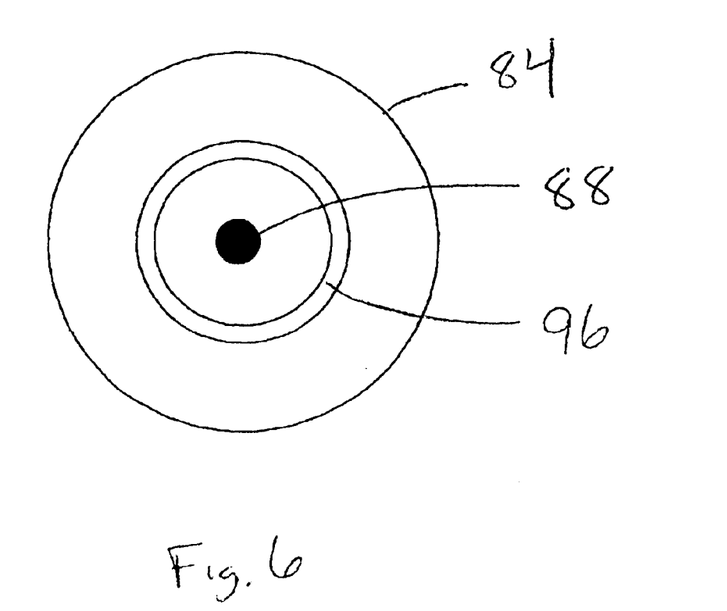
FIG. 6 is a top view of a portion of a male insulated block and male terminations for conductors extending through an opening in a stator lamination, according to a preferred embodiment of the present invention.

Referring generally to FIGS. 5 and 6, each group of conductors disposed through each axial opening 70 is terminated in an insulated block in the connectors. Male connector 54 has a male insulated block 84 (FIG. 6), while female connector 52 has a female insulated block 86 (FIG. 5). The insulated blocks insulate the conductors, e.g. bare copper wires, from one another. The insulated blocks may be readily formed from a moldable polymeric material. Exemplary insulating materials include polyetheretherketone (PEEK), kapton, and mylar.

In the illustrated embodiment, the plurality of conductive strands, disposed through each axial opening 70, are terminated in the insulated blocks with a single electrical termination. This reduces the overall number of electrical terminations that must be completed between modular motor modules. However, each conductor could have its own individual termination. Conductors that are terminated at a male insulated block 84 are terminated with a male termination 88 while the conductors terminated in a female insulated block 86 are terminated with a female termination 90. Each male termination 88 is disposed within a raised portion 96 of each male insulated block 84, while each female termination 90 is disposed in a recess 98 in each female insulated block 86. When two modular motor sections are abutted, the raised portion 96 of the male insulated block 84 is inserted into the recess 98 in the female insulated block 86. This causes the male terminations 88 to be guided and inserted into the female terminations 90.

Figure 7:
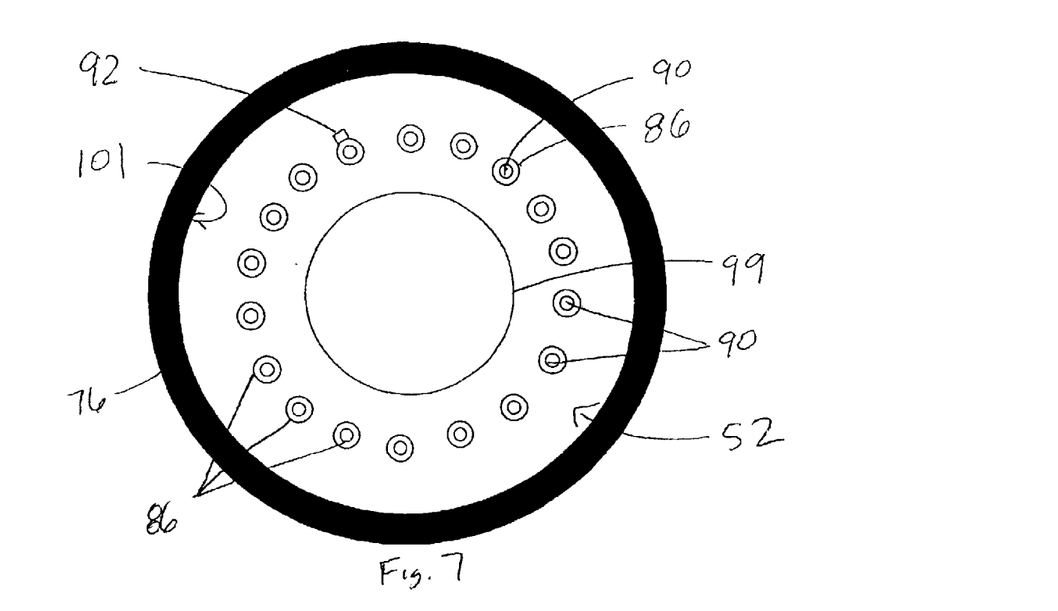
FIG. 7 is a top view of a modular stator section having a female end, according to a preferred embodiment of the present invention.
Figure 8:
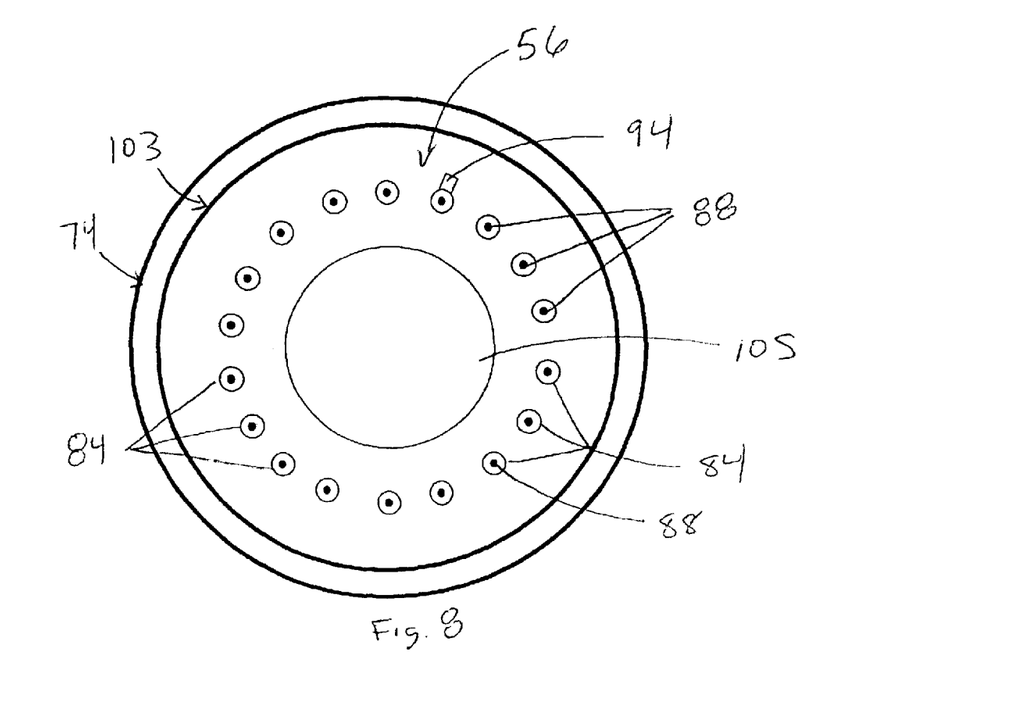
FIG. 8 is a top view of a modular stator section having a male end, according to a preferred embodiment of the present invention.

Referring generally to FIG. 7, a female end of a middle stator section 46 is illustrated. This female end includes female connector 52 having an opening 99, through which the rotor 60 passes. Female connector 52 is surrounded by threaded collar 76, having internal threads 101. In FIG. 8, an end view of the male end of a middle motor section 46 is illustrated. Male connector 56 is surrounded by threaded end 74, having external threads 103. Connector 56 also includes a central opening 105.

Figure 9:
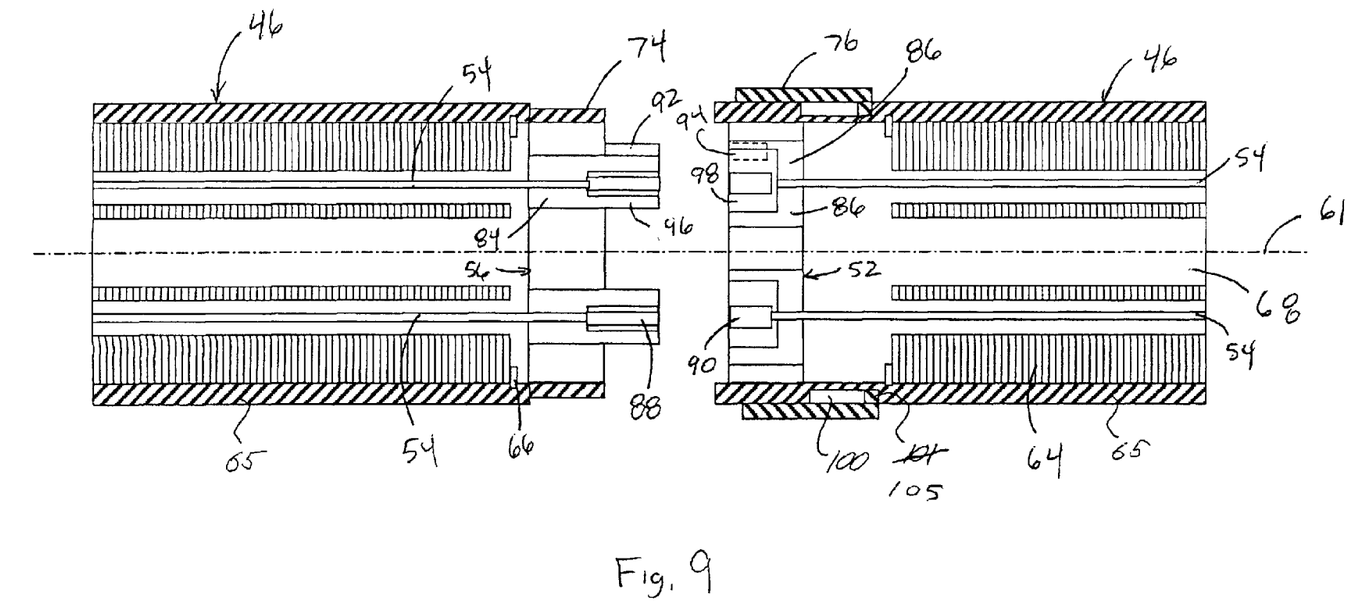
FIG. 9 is a cross-sectional view of two modular stator sections prior to coupling.
Figure 10:
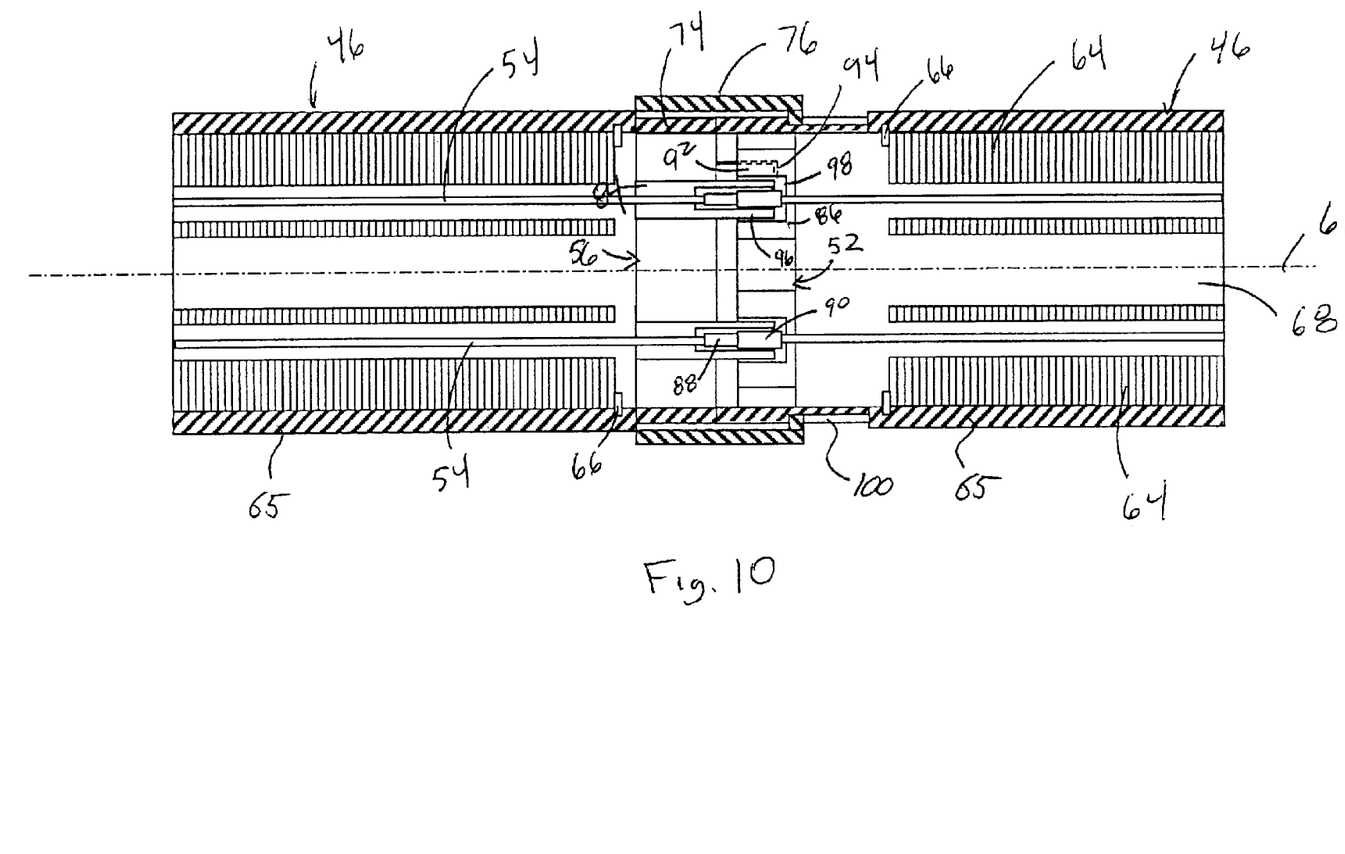
FIG. 10 is a cross-sectional view of two modular stator sections coupled together.

Referring generally to FIGS. 9 and 10, cross-sectional views are shown illustrating the process of joining two middle stator sections 46. In FIG. 9, the two middle stator sections 46 have not yet been joined. The threaded female collar 76 is moveable along a slot 100 in the outer housing, e.g. housing 65, of the stator section. Typically, collar 76 includes a ring 105 captured in slot 100 such that collar is rotatably retained to the appropriate outer housing.

Initially, the threaded female collar 76 is pulled away from the end of the modular stator section 46 on which it is mounted. With the ends exposed, the two modular stator sections 46 are axially aligned and brought together. In the illustrated embodiments, the insulated blocks and terminations are aligned with the key 92 and keyway 94 system. Once aligned, the two sections are brought together. Electrical coupling is accomplished by forcing the two stator sections together so that the male terminations 88 of one middle stator section 46 are inserted into the female terminations 90 of the next adjacent middle stator section 46. Once terminations 88 and 90 are joined, threaded collar 76 is tightened over threaded end 74, as illustrated in FIG. 10. This ensures a secure mechanical and electrical coupling of the components. Top stator section 42 and bottom stator section 44 may be joined to the appropriate ends of middle stator sections 46 in a similar fashion.

Figure 11:
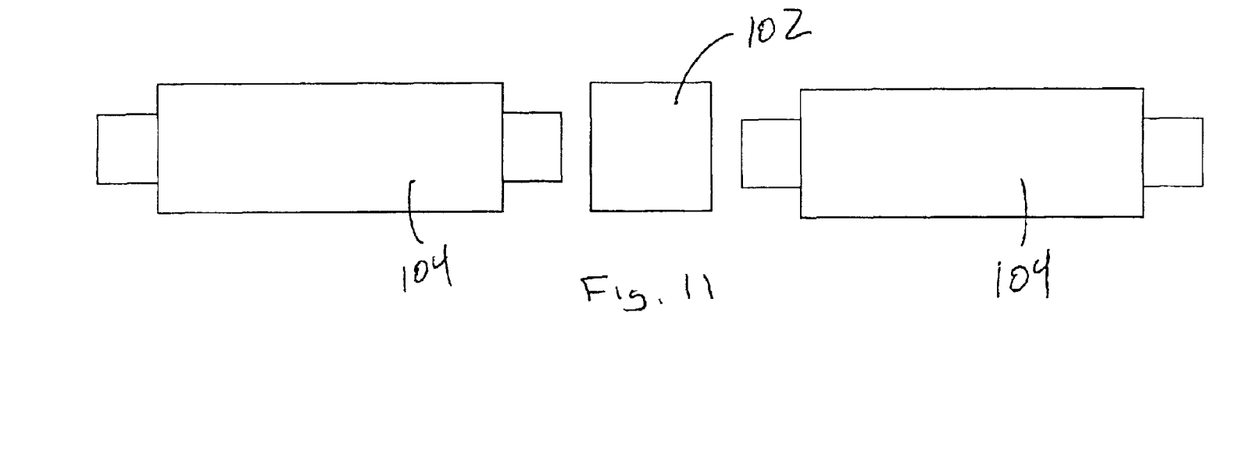
FIG. 11 is an alternative embodiment of an electric motor illustrating a coupling device to combine two middle stator sections together.
Figure 12:
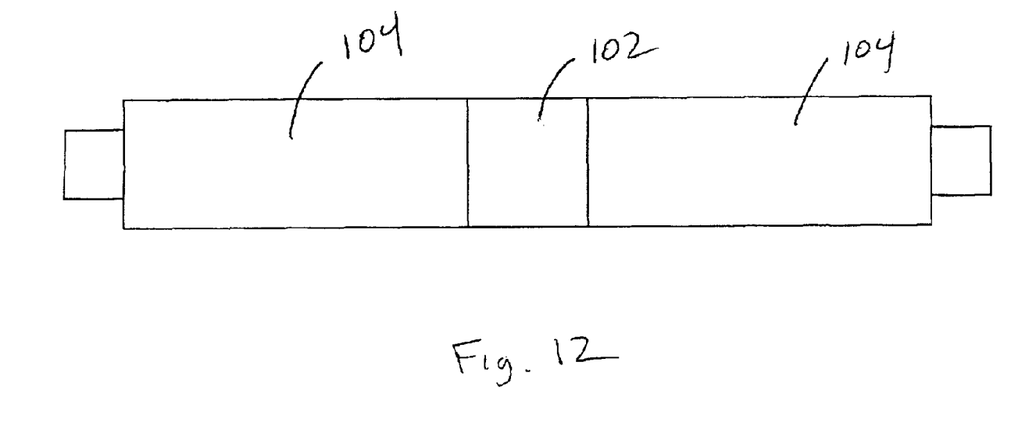
FIG. 12 is an alternative embodiment of an electric motor featuring two middle stator sections coupled together.

An alternate embodiment of the present invention is illustrated in FIGS. 11 and 12. In this embodiment, a separate coupler 102 is used to couple two middle stator sections 104. The separate coupling device 102 may be configured to electrically and mechanically connect stator sections 104. For example, each coupler 102 can include a plurality of receptacles, and each of the stator sections can include a plurality of conductive tips configured for insertion into the plurality of receptacles. Alternatively, the coupling device 102 may be configured such that the middle stator sections 104 are mechanically coupled by device 102 but electrically coupled directly to each other, rather than through the coupler 102.

It will be understood that the foregoing description is of a preferred embodiment of this invention, and that the invention is not limited to the specific forms shown. For example, a variety of different configurations can be can be used to electrically and mechanically couple individual stator sections to one another. A variety of component shapes and sizes may be utilized. Furthermore, different motor styles and types may benefit from the modular construction described above. Other components may be used to couple the modular stator sections. For example, the conductors may be terminated with male terminations and joined together by a female-to-female connectors inserted between the two modular stator sections. Indeed, various plug configurations and coupling structures can be used to combine components. Also, the subject motor may be utilized in a variety of systems and environments. These and other modifications may be made in the design and arrangement of the elements without departing from the scope of the invention as expressed in the appended claims.

What is claimed is:

1. An electric motor, comprising:
   a plurality of stator sections, each stator section comprising an outer housing and a plurality of laminations stacked and held within the outer housing, the plurality of laminations having aligned central openings and aligned radially outlying openings to receive conductors disposed generally longitudinally therethrough, wherein the plurality of stator sections are mechanically and electrically coupleable to form a stator of a desired length; and
   a single rotor shaft disposed through the plurality of stator sections.

2. The electric motor as recited in claim 1, wherein the plurality of stator sections includes:
   a first stator section, having a plurality of conductors extending longitudinally therethrough;
   a second stator section, electrically coupleable to an electrical power source and to the first stator section; and
   a third stator section, electrically coupleable to the first stator section;
   wherein electricity flowing through the plurality of stator sections produces a magnetic field that imparts rotative motion to the rotor.

3. An electric motor, comprising:
   a plurality of stator sections, each stator section comprising an outer housing, wherein the plurality of stator sections are mechanically and electrically coupleable to form a stator of a desired length; and
   a single rotor shaft disposed through the plurality of stator sections, wherein at least some of the plurality of stator sections are fluidly coupleable to allow a fluid flow therethrough.

4. An electric motor, comprising:
   a plurality of stator sections having:
     a first stator section with a plurality of conductors extending longitudinally therethrough;
     a second stator section, electrically coupleable to an electrical power source and to the first stator section; and
     a third stator section, electrically coupleable to the first stator section, each stator section comprising an outer housing, wherein the plurality of stator sections are mechanically and electrically coupleable to form a stator of a desired length, wherein electricity flowing through the plurality of stator sections produces a magnetic field that imparts rotative motion to the rotor; and
   a single rotor shaft disposed through the plurality of stator sections, further wherein the first stator section and the second stator section are fluidly coupleable to allow fluid to pass between the first and the second stator sections.

5. The electric motor as recited in claim 2, wherein the second stator section is fluidly coupleable to an external device.

6. The electric motor as recited in claim 1, further comprising a plurality of seals disposed between stator sections.

7. The electric motor as recited in claim 1, wherein at least one stator section includes a plurality of conductors terminating at a plurality of corresponding protrusions.

8. The electric motor as recited in claim 7, wherein at least one stator section includes a plurality of conductive elements configured for engagement with the plurality of corresponding protrusions when the stator sections are mechanically coupled.

9. The electric motor as recited in claim 8, wherein each conductive element includes a hollow receptacle sized to received a corresponding protrusion.

10. The electric motor as recited in claim 1, wherein at least one stator section is coupled to an adjacent stator section by a separate coupling device.

11. The electric motor as recited in claim 10, wherein the coupling device is configured to mechanically and electrically couple the at least one stator section to the adjacent stator section.

12. The electric motor as recited in claim 10, wherein each coupling device includes a plurality of receptacles to receive a corresponding plurality of protruding conductors.

13. The electric motor as recited in claim 1, wherein each stator section outer housing includes at least one of a threaded collar and a threaded end.

14. A submersible pumping system, comprising:

a submersible electric motor, comprising:
- a plurality of modular motor sections, each motor section comprising a stator section, a housing section and at least one fluid passageway, wherein the modular motor sections are mechanically, electrically and fluidly coupleable to form a motor of a desired length; and
- a rotor disposed within the plurality of modular motor sections; and a submersible pump drivingly coupled to the rotor of the submersible electric motor.

15. The submersible electric motor as recited in claim 14, wherein the plurality of modular motor sections includes:
- a first stator section, having a plurality of conductors extending longitudinally therethrough;
- a second stator section, electrically coupleable to a source of electrical power and to the first stator section; and
- a third stator section, electrically coupleable to the first stator section;

wherein electricity flowing through the plurality of stator sections produces a magnetic field that imparts rotative motion to the rotor.

16. A submersible pumping system, comprising:

a submersible electric motor, comprising:
- a plurality of modular motor sections, each motor section comprising a stator section and a housing section defining an outer surface of the submersible pumping system, wherein the modular motor sections are mechanically and electrically coupleable to form a motor of a desired length; and
- a rotor disposed within the plurality of modular motor sections;

a submersible pump drivingly coupled to the rotor of the submersible electric motor; and a motor protector, wherein the plurality of modular motor sections are fluidly coupleable so as to allow fluid to pass between the motor protector and an adjacent modular motor section.

17. An electric motor for a submergible pumping system, comprising:
- a plurality of combined stator and outer housing sections adapted to form a motor of a desired length, wherein each of the plurality of combined stator and outer housing sections comprises at least one of a threaded collar and a threaded portion adapted to receive the threaded collar to enable each of the plurality of combined stator and outer housing sections to be mechanically and electrically connected to an adjacent combined stator and outer housing section; and
- a rotor shaft disposed through the plurality of combined stator and outer housing sections.

18. The electric motor as recited in claim 17, wherein each of the plurality of combined stator and outer housing sections is fluidly coupleable to an adjacent combined stator and outer housing section.

19. The electric motor as recited in claim 17, wherein each of the plurality of combined stator and outer housing sections comprises a plurality of conductive elements configured for engagement with a corresponding plurality of conductive elements in an adjacent combined stator and outer housing section.

* * * * *